United States Patent [19]

Zachariadis

[11] 4,446,538

[45] May 1, 1984

[54] MARINE CABLE LOCATION SYSTEM

[75] Inventor: Robert G. Zachariadis, Dallas, Tex.

[73] Assignee: Mobil Oil Corporation, New York, N.Y.

[21] Appl. No.: 358,756

[22] Filed: Mar. 16, 1982

[51] Int. Cl.³ .............................................. G01V 1/38
[52] U.S. Cl. ...................... 367/19; 367/106; 367/99
[58] Field of Search ...................... 367/16, 19, 2, 106, 367/118, 5, 6, 15, 130; 181/110

[56] References Cited

U.S. PATENT DOCUMENTS

| | | | |
|---|---|---|---|
| 3,905,007 | 9/1975 | Koesy | 367/2 |
| 3,953,827 | 4/1976 | Le Moal et al. | 367/19 |
| 4,187,492 | 2/1980 | Delignieres | 367/19 |
| 4,229,809 | 10/1980 | Schwalbe | 367/6 |

Primary Examiner—Maynard R. Wilbur
Assistant Examiner—K. R. Kaiser
Attorney, Agent, or Firm—Alexander J. McKillop; Michael G. Gilman; George W. Hager, Jr.

[57] ABSTRACT

An acoustic positioning system locates a marine cable at an exploration site, such cable employing a plurality of hydrophones at spaced-apart positions along the cable. A marine vessel measures water depth to the cable as the vessel passes over the cable and interrogates the hydrophones with sonar pulses along a slant range as the vessel travels in a parallel and horizontally offset path to the cable. The location of the hydrophones is determined from the recordings of water depth and slant range.

4 Claims, 3 Drawing Figures

MARINE CABLE LOCATION SYSTEM

BACKGROUND OF THE INVENTION

This invention relates to seismic exploration and more particularly to marine exploration. In marine exploration, seismic energy is generated in the water and reflections and refractions of such energy from subsurface formations are detected by a linear string of detectors or hydrophones. The seismic energy sources and the hydrophones are towed through the water to an exploration site by means of cables extending from a marine vessel. At the exploration site, the exploration operation may be carried out with the seismic detector cable either continuously moved through the water during seismic energy generation or fixed in position in the water layer or on the water bottom. Reflection and refraction signals received by the hydrophones along the detector cable are transferred to the marine vessel through the cable wiring for recording and processing.

During the processing of such seismic signals, precise measurements of the hydrophones positions are required in order to insure maximum accuracy in the static and dynamic corrections generally applied to the obtained seismic data. One method for determining the instantaneous position of various points along a seismic detector cable is disclosed in U.S. Pat. No. 3,953,827 to Le Moal et al and U.S. Pat. No. 4,231,111 to W. P. Neeley. The position of each selected point is determined by measuring the angle of the tangents of the cable at such points with a fixed and known direction, such as magnetic north. At each measuring point along the cable there is located preferably a magnetic compass. By knowing the heading of the tangents to the cable at such plurality of points along the cable and the distances between each of such points, the location of the cable along its entire length can be estimated.

Other systems are known for locating single objects in large bodies of water utilizing the measurement of the time interval required for an energy pulse to travel underwater between two points. One such system is described in U.S. Pat. No. 3,353,149 to D. H. Frantz, Jr., et al.

SUMMARY OF THE INVENTION

In accordance with the present invention, there is provided a method and system for locating a plurality of hydrophones positioned along a seismic exploration line. A path is traversed parallel to and offset horizontally from an estimated location of the hydrophones by a vessel having means for interrogating each of the plurality of hydrophones with sonar pulses, the outputs from each of the hydrophones being recorded as a measure of the slant range from the vessel to the hydrophones. The water depth at the location of the hydrophones is measured. The horizontal range of the parallel and offset path to the plurality of hydrophones is determined from the measurements of slant range and water depth. The exact position of each of the plurality of hydrophones is identified from the horizontal range determinations and the known navigational coordinates of the vessel.

In a more specific aspect, the water depth is measured by sonar as the vessel traverses a path over the estimated location of the exploration line. The slant range from the vessel to each hydrophone as the vessel traverses at least one parallel and horizontally offset path to the exploration line is measured a plurality of times by means of a sonar interrogation unit located on the vessel. The slant range position for each hydrophone is identified by the intersection of a set of loci of the plurality of slant range measurements obtained from the travel times of the sonar pulse to each hydrophone.

DESCRIPTION OF THE PREFERRED EMBODIMENT

In the development of marine exploration, the seismic detector cables have become quite long, extending for one mile, two miles, or even farther behind the marine vessel. Such lengths can cause problems in accurately determining the position of the hydrophones comprising the cable since it is unlikely that cables of such lengths will extend in a straight line behind the towing vessel or even be configured in the shape of a single arc of curvature. Rather, the cable may have one or more inflection points in its curvature and may extend laterally to one or even both sides of the towing vessel.

The present invention is therefore directed to a new method for accurately locating hydrophones along seismic detector cables of great lengths which may be fixed in position in the water layer or on the ocean bottom. Such method may further employ a separate marine vessel from the cable towing vessel for carrying out either or both of the depth and slant ranging measurements of the new and improved acoustic position system of the present invention.

Figure 1:
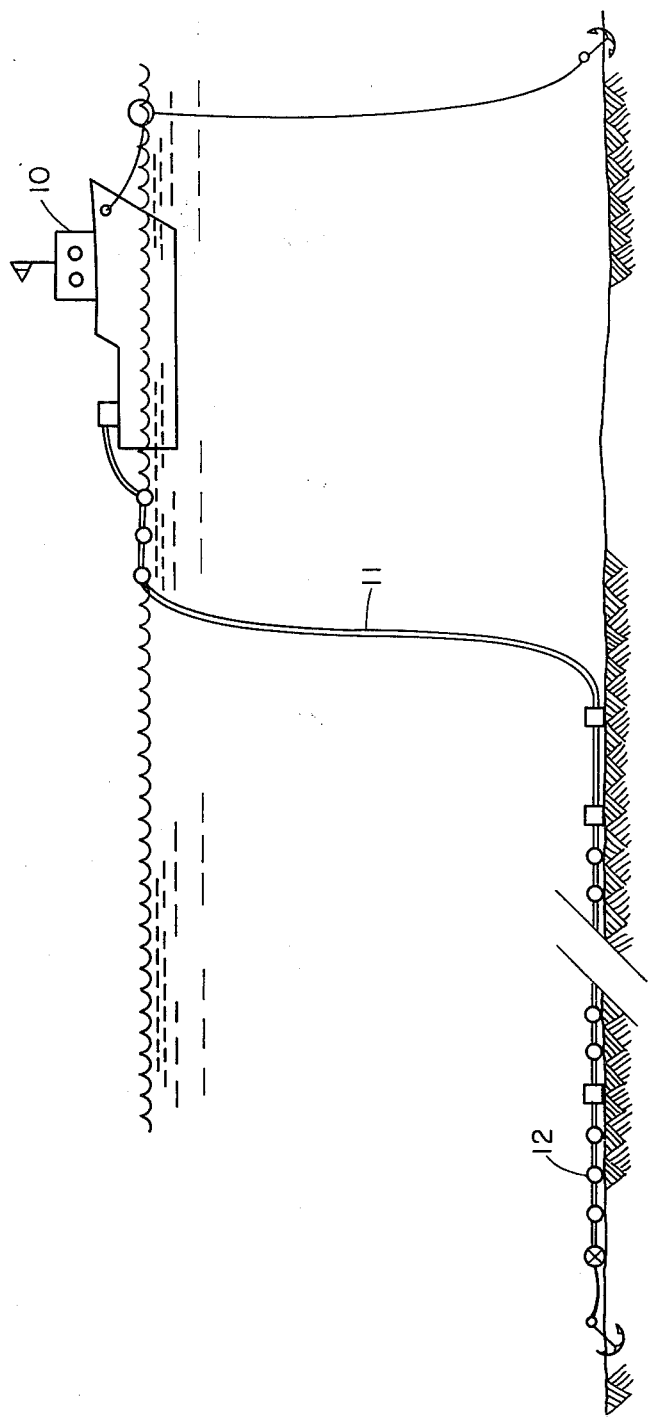
FIG. 1 illustrates a seismic exploration system employing a marine vessel and a marine seismic cable comprising hydrophones.

Referring now to FIG. 1, there is shown a preferred embodiment of the present invention in which the towing vessel 10 deploys a seismic detector cable 11 having a plurality of hydrophones 12 on the ocean bottom along a pre-selected line of exploration. The cable 11 is bottom weighted so that the hydrophones 12 remain fixed in position on the ocean bottom as long as the marine vessel holds a fixed position on the water surface. Having deployed the seismic detector cable, a conventional seismic survey is then carried out by traversing the area with a separate seismic shooting vessel employing one or more seismic energy sources preferably towed through the water by means of a cable extending from such vessel. Seismic energy from such sources is reflected and refracted by the subsurface formations and returns to the earth's surface along the ocean bottom where it is detected by the hydrophones 12 of the seismic detector cable 11 and transmitted to the vessel 10 for recording and processing.

Figure 3:
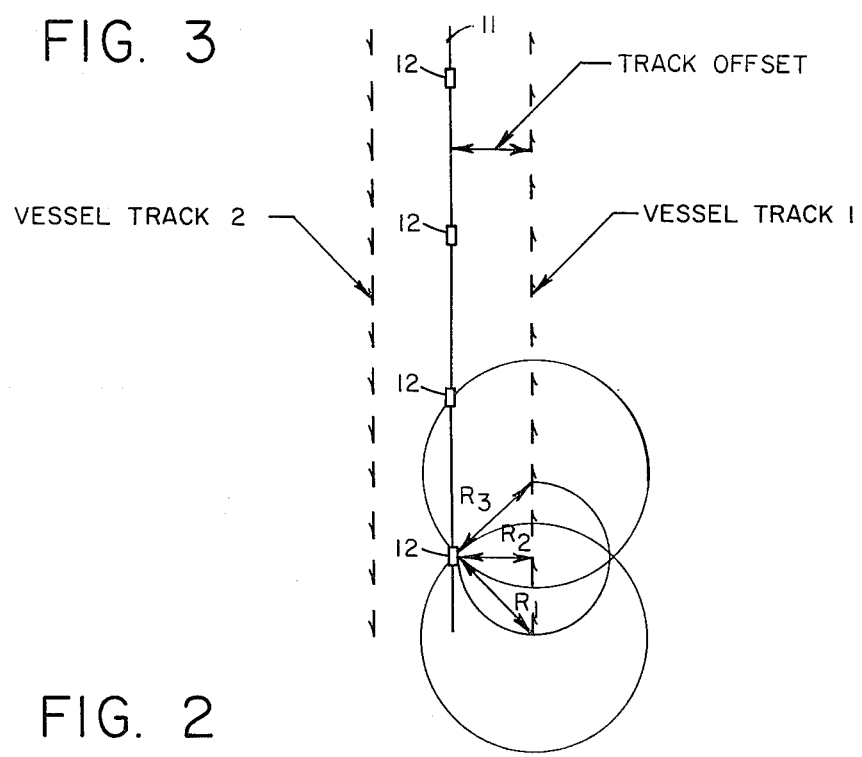
FIGS. 2 and 3 illustrate an acoustic positioning operation for determining the location of the hydrophones of FIG. 1.
Figure 2:
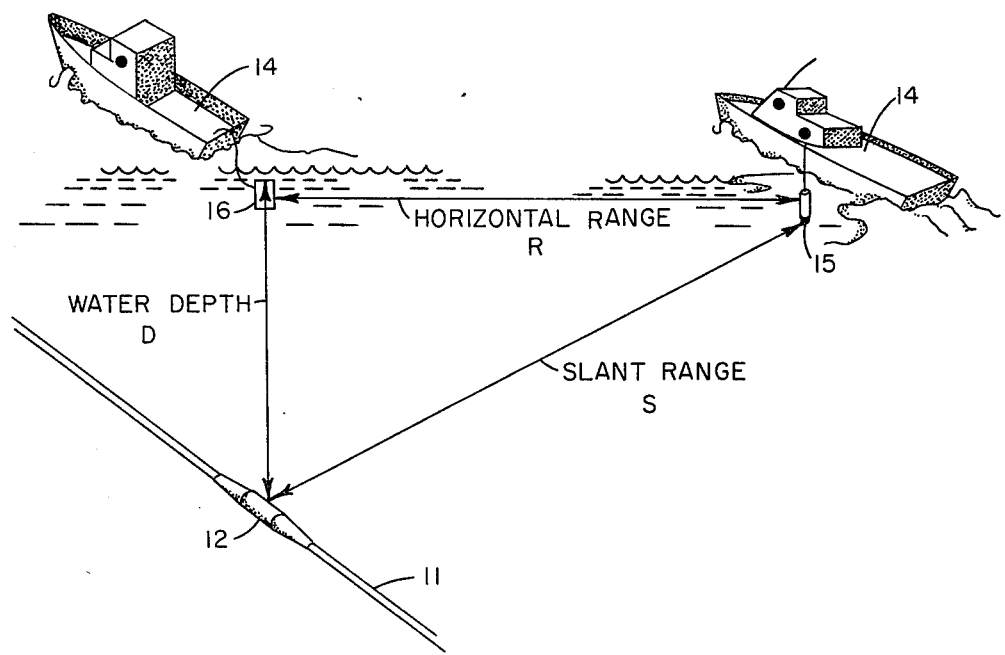

Precise measurement of the location of the hydrophones along the ocean bottom is required in order to accurately process the seismic reflection and refraction signals received during the exploration operation. In accordance with a specific aspect of the present invention, such locations are determinable from two measurements carried out by the acoustic positioning system as illustrated in FIG. 2. Firstly, the vessel 14 traverses a path parallel to and offset from an estimated location for the cable 11, as shown in both FIGS. 2 and 3. This slant range measurement is accomplished by interrogating each of the hydrophones from the vessel 14 by means of a sonar interrogation unit 15. The sonar pulses received by the hydrophones 12 are transferred by the cable 11 to the recording vessel 10. The recording equipment on board the recording vessel 10 is synchronized with the sonar interrogation unit on the vessel 14 so as to be able to determine the travel time of the sonar pulse from the vessel 14 to the hydrophone 12. Secondly, the water depth D at which the cable 11 is positioned is either known or is measured for example, by passing the vessel 14, with its sonar interrogation unit one or more times along or in criss-crossing manner directly over the estimated cable location. Knowing the slant range S, to each hydrophone 12, water depth D, and the exact location of the interrogation unit 15, the locus of possible positions for each hydrophone may be determined. As illustrated in FIG. 3 the vessel 14 moves in a parallel, but offset manner to the estimated location for cable 11, preferably one track on each side of the cable, thereby establishing a set of loci, $R_1$, $R_2$ and $R_3$ for example, the intersections of which define the position of each hydrophone 12. In a preferred mode of operation, the vessel 14 moves at about one to two knots and the interrogation unit 15 interrogates each hydrophone 12 five to ten times for each of the two parallel, offset tracts. Such hydrophone positions are identified relative to the fixed position of the interrogation unit 15 of the vessel 14. The position of the vessel, in terms of latitude and longitude coordinates, and hence the interrogation unit 15, is determined by an on-board navigational system utilizing satellite navigation monitoring and/or radio signals from shore based navigation stations.

The foregoing described method of the present invention may be repeated any number of times to more precisely define the location of the hydrophones 12. By repeating the described traverses with the vessel 14, the location of each hydrophone is refined to allow for sound refraction effects due to variations in the velocity of sound with water depth.

In the above described preferred embodiment, the vessel navigation system is a Miniranger IV radio navigation system. The water depth system is a standard precision echosounder or oceanographic fathometer. The slant ranging system is an EG and G Sealink ranging sonar positioning system. The marine cable is in the order of 3000 meters of active length with acoustic transponders spaced in the order of 300 meters along the cable. Such an acoustic positioning system of the preferred embodiment permits accurate cable position identification in up to 300 meters of water depth.

Although the present invention has been described in connection with a preferred embodiment, various modifications and changes may be made without departing from the spirit and scope of the present invention as set forth in the appended claims.

I claim:

1. A method for locating hydrophones fixed in position at a known water depth along a seismic marine exploration line, comprising the steps of:
   (a) traversing at least one predetermined path parallel to and offset horizontally from an estimated location for said hydrophones with a vessel having a sonar ranging unit for interrogating each of said hydrophones with a sonar pulse a plurality of times during each parallel and horizontally offset traverse of the vessel to provide a plurality of slant range recordings for each of said hydrophones;
   (b) plotting the set of loci of said plurality of slant range recordings for each of said hydrophones,
   (c) identifying the interesection point of said set of loci for each of said hydrophones as the location of said hydrophone at which the slant range from said hydrophone to the line of travel of said vessel is a minimum, and
   (d) determining the horizontal range of each of said hydrophones from said predetermined path of said vessel utilizing the known water depth of the hydrophones and the identified minimum slant range values for each of said hydrophones to the predetermined path of said vessel.

2. The method of claim 1 further including the steps of:
   (a) traversing a second predetermined path with said vessel parallel to and offset horizontally on the opposite side of said hydrophones from said at least one predetermined parallel path for determining the minimum slant range from said vessel to each of said plurality of hydrophones for said second predetermined path; and
   (b) determining the horizontal range of said second predetermined parallel path from said hydrophones utilizing the known water depths of the hydrophones and the identified minimum slant range values for each of said hydrophones to said predetermined parallel path of said vessel.

3. The method of claim 1 wherein said marine cable is fixed in position above the water bottom.

4. The method of claim 1 wherein said marine cable is fixed in position on the water bottom.

* * * * *